United States Patent Office 2,919,254
Patented Dec. 29, 1959

2,919,254
ACRYLAMIDE AND AROMATIC HYDROCARBON MONOMER MODIFIED INTERPOLYMERS OF MALEINIZED OILS

Roger M. Christenson, Whitefish Bay, and Henry A. Vogel, Milwaukee, Wis., assignors to Pittsburgh Plate Glass Company No Drawing. Application March 22, 1954
Serial No. 417,968

3 Claims. (Cl. 260—23)

This invention relates to novel copolymers and interpolymers and it has particular relation to soluble ungelled interpolymers of (A) esters of (1) alpha-beta ethylenic dicarboxylic acids and (2) hydroxy esters of polyhydric alcohols and higher fatty acids such as those of naturally occuring glyceride oils, and (B) a system of monomers containing >C=CH$_2$ groups, one of said monomers being an acrylamide. Such interpolymers, in many instances, are characterized by one or more properties such as good compatibility with various other resins, good solubility in glyceride oils and hydrocarbon solvents, a capacity for drying when baked at relatively rapid rate to form films which are mar resistant, solvent resistant, and of other desirable properties. For these reasons the new interpolymers are valuable for use as coating media for surfaces of wood, metal, stone, brick, as well as various other conventional materials.

In a copending application to Roger M. Christenson, Serial Number 334,970, filed February 3, 1953, Patent No. 2,850,469, is disclosed a method of preparing an interpolymer of (A) an ester of an alpha-beta ethylenic dicarboxylic acid such as maleic acid and a hydroxy ester of a polyhydric alcohol such as glycerol and a higher fatty acid such as the acid components of unsaturated glyceride oils, and (B) a liquid, soluble monomer such as styrene, or an ester such as methyl methacrylate, containing a >C=CH$_2$ group attached to a negative radical. The products, when prepared in accordance with the provisions of the foregoing invention, are usually soluble ungelled materials that can be dissolved in various hydrocarbons such as toluene or xylene and which can be employed as coating media for surfaces of various materials such as wood, metal, stone, brick or the like, previously referred to. Liquid films so applied can be hardened to a durable useful state by air drying or by baking in conventional and well-known manner.

In copending application to Roger M. Christenson, Serial Number 363,690, filed June 23, 1953, it is further disclosed to incorporate with the interpolymer products of the preceding application certain free ethylenically unsaturated acids such as acrylic acid. Such incorporation is found to improve the properties of the interpolymers for some applications; for example, the inclusion of the unsaturated free acid is found quite substantially to increase the compatibility of the interpolymers with respect to nitrogen containing resins such as melamine and urea resins.

The present invention comprises the discovery that the interpolymer products of either of the foregoing applications, in certain respects, can be even further improved for some uses, through what would appear to be a synergistic, or adjuvantic effect exerted by an acrylamide as a comonomer with another monomer containing a >C=CH$_2$ group attached to a negative radical. The synergistic effect particularly manifests itself by a speeding up of the rate of drying of the films from the interpolymer, an improvement in mar resistance in the baked films, and an improvement in various other important properties. The acrylamides in the comonomer include the group represented by the formula:

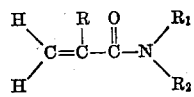

In the formula, groups R, R$_1$ and R$_2$ may be hydrogen or they may be hydrocarbon groups (preferably of relatively low molecular weight) or they may be substituents for hydrogen which do not adversely affect the compatibility of the compound with respect to the other components of the interpolymerizable system or which are not themselves reactive to a substantial degree with the remaining components of the interpolymer. Especially useful products are obtained when the groups R$_1$ and R$_2$ of the acrylamide are hydrogen, and when R is hydrogen or hydrocarbon and notably methyl or ethyl.

In the preparation of the interpolymers of this invention, three main steps may conveniently be employed:

In the first of these steps, an appropriate hydroxy ester of a polyhydric alcohol or a mixture of polyhydric alcohols and a higher fatty acid is prepared. This operation may be effected by esterification reaction in well-known manner, of a higher fatty acid or mixture of fatty acids such as those derived from alcoholysis of linseed oil, soybean oil, cotton seed oil or the like. In the reaction, the acids preferably are employed in such amount as to obtain a partial ester containing a suitable number (usually about 1) of available hydroxyls.

Another common and often more convenient, or economical method of preparing hydroxylated esters of polyhydric alcohols and the higher fatty acids involves preliminary alcoholysis of a glyceride oil such as soya-bean oil or linseed oil with a polyhydric alcohol, such as glycerol, pentaerythritol or the like in a manner which will be more fully elaborated upon hereinafter.

A second step of the process as herein disclosed, comprises esterification reaction between the foregoing partial esters containing available hydroxyls and a suitable polycarboxylic acid such as maleic acid or fumaric acid in order to provide an ester which preferably is neutral or at least of relatively low acid value and in which the chain length is not extended unduly.

The third step of the process comprises interpolymerizing the foregoing second step ester of a polycarboxylic acid and a hydroxy ester of a polyhydric alcohol and one or more fatty acids with a monomer system including an acrylamide as previously described, with another monomer containing >C=CH$_2$ group attached to a negative radical.

Each of the foregoing steps and the materials involved, will now be more fully elaborated upon.

In the first step of the foregoing process any polyhydric alcohol which is reasonably compatible with the fatty acids, or the glycerides employed as starting materials in the first step ester of this invention may be used. Especially suitable polyhydric alcohols are those which contain from about 2 to 6 hydroxyl groups per molecule. Examples of such polyhydric compounds comprise ethylene glycol, diethylene glycol, propylene glycol, glycerol, pentaerythritol, polyethylene glycol, sorbitol, tetramethylol cyclohexanol, alpha-methyl glucoside, erythritol, dipentaerythritol, polypentaerythritol, polyallyl alcohol and the like, as well as mixtures of any two or more of the above polyhydric compounds. These may be employed either to esterify the fatty acids or to alcoholize the triglycerides of the acids by ester interchange.

The drying oil acids in the form of free acids, or their triglycerides, utilized in preparing the foregoing first step esters in accordance with the present invention, include the acids of substantially any of the glyceride oils recognized as having drying properties. The acids of so-called semi-drying oils are also included in mixtures of the drying oil acids. Such mixtures also in most instances, include some non-drying acids such as oleic acid, palmitic acid, stearic acid and the like. These saturated and semi-saturated acids if not present in unduly large amounts, are also permissible. It is to be understood that concentrates of unsaturated acids such as linoleic acid, linolenic acid and clupanodonic acid which may be obtained by distillation operations in well-known manner, may also be employed in the preparation of the first step partial esters. Convenient sources of these various acids are the drying and semi-drying oils such as linseed oil, cotton seed oil, safflower oil, soybean oil, tung oil, oiticica oil, menhaden oil, sardine oil and the like. Soap stocks and foots acids from the refining of these oils are also sources of such acids which may be utilized in the process of this invention.

Where the hydroxy esters of drying oil acids and a polyhydric alcohol are prepared by alcoholysis of a glyceride oil in the manner previously referred to, the techniques commonly employed in the preparation of esters for the modification of alkyd resins may be utilized. Such alcoholysis is a well-known procedure and usually involves the heating of about 2 moles of the oil with the desired proportion of the polyhydric compound in order to obtain a partial ester containing the desired number of free hydroxyls. The reaction is usually conducted in the presence of an alcoholysis catalyst such as litharge. It is also convenient to blanket the reaction with an inert gas designed to prevent oxidation of the double bonds of the hydrocarbon portions of the acid. The alcoholysis reaction may be conducted at a temperature in a range of about 150° to 300° C. or higher. For purposes of the present invention, partial esters which are at least about 50 percent monohydric are preferred and it is considered that especially favorable results are obtained with partial glyceride products in which the ratio of the monoglycerides to the diglycerides is even higher, for example above about 2 to 1. In some instances, it is probable that the partial glycerides are almost completely monohydric. These monohydric glycerides are of the general formula:

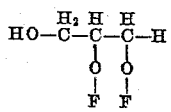

where F represents fatty acid radicals. If polyhydric alcohols other than glycerol are used, they can be so proportioned and the alcoholysis reaction can be so conducted as to obtain a major percentage of monohydric esters. These, of course, can react to form neutral esters with but a single dicarboxylic acid radical per molecule.

In the second step of the preparation of the polymer products of this invention, the polycarboxylic acid component, preferably is alpha-beta ethylenically unsaturated and includes the following skeletal grouping:

This grouping includes carbon-oxygen conjugation. This group is well adapted to interpolymerize by addition with the monomer pairs of this invention. No attempt has been made to fill out the various possible atoms and radicals such as hydrogen, $CH_3$, carboxyl and the like in the skeletal grouping. In referring to the polycarboxylic acids, it is to be understood that the term is used in a generic sense to include the anhydrides of the acids where the latter exist. In fact, the anhydrides usually react more readily than the free acids and often, are preferred. The products of esterification are essentially the same as obtained by use of the free acids.

Suitable alpha-beta ethylenic dicarboxylic acids for the esterification reaction of the second step in the preparation of the products of this invention include maleic acid, fumaric acid, itaconic acid and others taken singly or in mixtures. Some non-ethylenic dicarboxylic acids, such as phthalic acid or adipic acid, may also be included.

The esterification reaction between the ethylenically unsaturated polycarboxylic acid and the hydroxy ester of a drying oil acid or acids and the polyhydric compound is preferably conducted in an inert diluent which may be adapted to form an azeotropic vapor mixture with the water of reaction. Appropriate non-reactive diluents include xylene, toluene, solvent naphtha, or other suitable liquid solvents which are non-reactive with the ethylenically unsaturated polycarboxylic acid, or the ester of the drying oil acids and the polyhydric compond and which is of reasonably high boiling point. Normally the esterification reaction is conducted under a separator designed to pass the evolved water from the system while returning the solvent for further cycling in the reaction. Since the solvent is thus recycled or refluxed, the reaction may be conducted with but relatively small amounts thereof. A convenient amount of non-reactive diluent or solvent is from about 10 to 20 percent based upon the total reactants. However, either smaller or larger amounts may be utilized, if so desired.

The apparatus employed in conducting the reaction is conventional and will depend upon the scale upon which operations are conducted as well as other factors. For example, on a laboratory scale, the reaction may be conducted in a conventional glass flask provided with temperature measuring means, such as a thermometer, a reflux condenser, agitating means, a source of inert gas, and other suitable appurtenances. When the reaction is conducted on a larger scale, for example on such scale as is employed in commercial operations in a factory, a conventional kettle of stainless steel and of a size commensurate to the batches to be prepared may be employed. This kettle, also, is equipped with agitating means, sources of inert gas for blanketing the reaction and for sweeping out residual volatile matter, temperature measuring means, reflux condensers, separators for effecting stratification and removal of the water from the solvent medium and so forth. Needless to say, the reaction container such as the kettle should be equipped with heating means, such as electrical coils, gas burners, or any other appropriate device by means of which the reaction mixture can be brought to and maintained at desired temperature. It is also desirable that the reaction apparatus should be equipped with means whereby small samples of the esterification product can be drawn off from time to time for purposes of checking the progress of the reaction through tests of the viscosity, acid number and such like properties.

The esterification reaction is customarily carried out at the boiling temperature of the mixture of reactants and solvents (if any solvents are employed) or at such temperature as will evolve water of reaction. It is continued until water ceases to evolve, or until the reaction temperature reaches a predetermined value or until the ester product reaches the desired viscosity and acid number. In any event, the reaction is stopped before the product becomes infusible and insoluble in petroleum naphtha. Normally such value will be obtained when the reaction mixture reaches a temperature within a range of 150° C. to about 250° C. In order that the functionality of the unsaturated bonds in the alpha-beta unsaturated acid radicals of the product should not be substantially reduced, it is desirable that the temperature be maintained at a level below that at which the conjugated acid readily adds to the oil. The time for completion of the reaction depends upon the temperature and other factors and by observation of the appropriate criteria as above indicated can readily be determined experimentally in the manner employed conventionally in the manufacture of alkyd resins. In any event, the reaction can usually be completed within a period of about 2 to 20 hours or thereabouts. The reaction should be halted before infusible, insoluble ester products result.

The relative proportions of the ethylenically unsaturated polycarboxylic acid and the ester of the drying oil acid with the polyhydric compound which are utilized in preparing the second step product are important in obtaining a product which may in turn be polymerized with a compound containing a $>C=CH_2$ group to form a soluble, ungelled interpolymer. Generally, the reactants will be so proportioned that the esters formed will have a fatty acid content which if calculated as equivalent glyceride oil would constitute about 75 to 90 percent by weight of the total mixture of the reactive components of the ester system. The ethylenically unsaturated polycarboxylic acid radicals in the molecules of the resulting ester will constitute about 10 to 25 percent by weight of the total ester product. Free polyhydroxy compound may also be present in the esters of the unsaturated acid in small quantities. Stated in still another way, the ethylenically unsaturated polycarboxylic acid or its anhydride may be employed in such amount that from 25 to about 50 percent of the hydroxyl groups of the polyhydric compound are esterified by the ethylenically unsaturated polycarboxylic acid. The preferred range is about 25 to about 45 molar percent.

It is to be understood that the optimum proportions of the constituents of the ethylenically unsaturated polycarboxylic acid-polyhydric alcohol-fatty acid ester will vary for different oils and acids, likewise the proportions are influenced to some extent by such factors as the excess in which the polyhydric compound is employed, the solvent employed, the nature of the reaction catalyst as well as the amount of catalyst and the method of adding the same to the reaction mixture. The composition of the ester is further influenced by the particular ethylenic monomer which is subsequently employed in the copolymerization. However, for most combinations, satisfactory proportions will be found within the above indicated ranges.

The esters of the ethylenically unsaturated polycarboxylic acid and the drying oil acid-polyhydric alcohol esters obtained in the second step process are of low acid number, for example about 15 or lower so that it is apparent that relatively few available carboxyls are present in the resultant ester. The ester is therefore, not a partial, or half ester; but rather is an essentially neutral ester and usually it is believed to comprise large amounts of short chain neutral esters comprising a single carboxylic acid radical attached to a pair of polyhydric alcohol-fatty acid radicals. This is especially true in those instances where the latter component comprises primarily monohydric esters. The preparation of such an essentially neutral ester and its subsequent polymerization with a compound containing a terminal $>C=CH_2$ group constitutes a most unusual feature of the present invention since it has heretofore been believed that it is impossible, or impracticable to polymerize a substantially neutral ester of an ethylenically unsaturated polycarboxylic acid with a monohydric drying oil-polyhydric ester and a compound containing a $>C=CH_2$ group to obtain a copolymer which is soluble and ungelled. In fact, it has heretofore been assumed that a half ester of the dicarboxylic acid must be polymerized with the ethylenic monomer and the polymer subsequently esterified, in order to obtain a resultant copolymer which would be ungelled and readily soluble in conventional solvents.

The third step of the process involved in preparing the useful interpolymers of this invention comprises the interpolymerization of the carboxylic acid ester of the second step with a monomer system comprising an acrylamide and another soluble compound containing $>C=CH_2$ groupings. The most common and presently most useful acrylamides are acrylamide per se or methacrylamide; but derivatives of these containing various substituents for hydrogen, as previously described, are also included within the scope of the invention.

Useful comonomers which may be employed in combination with acrylamide, or methacrylamide in preparing the third step interpolymers in accordance with the provisions of the present invention, include hydrocarbons having benzene rings, such as styrene, alpha methyl styrene, vinyl toluene, or acrylic acid esters and methacrylic acid esters such as methyl and ethyl acrylate, methyl and ethyl methacrylate and allyl acrylate. Esters of allyl alcohol and saturated fatty acids such as allyl acetate, methallyl acetate, allyl oleate and others are also within the scope of the present invention, since they may be mixed with acrylamide and methacrylamide and copolymerized with the second step esters such as are included in the subsequent examples of this application. A further type of monomers which may be employed in conjunction with acrylamide or methacrylamide to provide monomer pairs includes the conjugated dienes, such as butadiene, isoprene and the like. Certain vinyl esters such as vinyl acetate, vinyl oleate and the like may be suitable monomers.

In order to obtain soluble, ungelled copolymers of the monomer systems herein disclosed and the second step ester products of the dicarboxylic acids and the hydroxy esters of polyhydric alcohols and higher fatty acids, it is desirable that the reaction be conducted in the presence of a suitable non-reactive solvent or diluent. Appropriate diluents include xylene, toluene, carbon tetrachloride, ethylene dichloride and other liquid media which do not react with any component of the interpolymerizable mixture to an appreciable extent and which are slovents or diluents for both the second step ester and the monomers of the monomer system. The quantity of solvent or diluent utilized is not critical and may be varied widely. Suitable proportions comprise about 0.10 to 10 or more parts by weight per part of total mixture of interpolymerizable components. Good results have been attained by use of about 50 to 70 percent by weight based upon the total mixture, of xylene.

The quantity of mixture of ethylenic monomers including the synergistically effective acrylamide component, which is incorporated into the interpolymerizable mixture is susceptible of wide variation. For example, the total of the monomer mixture may be as low as about 10 percent by weight of the second step ester which is utilized. On the other hand, the ethylenic monomer mixture including the acrylamide component may comprise as much as about 75 to 100 percent by weight upon the basis of the second step ester in the mixture. The acrylamide or methacrylamide component comprises about 5 to about 20 percent of the interpolymerizable mixture. The fact that the ethylenic monomer can be utilized in such widely varying proportions in order to obtain soluble, ungelled copolymers and interpolymers constitutes an important advantage of the present invention. Heretofore, it has been believed that the use of more than about 15 percent by weight of the ethylenic monomer would result in the production of a gelled copolymer, or interpolymer and being insoluble in conventional solvents.

In the interpolymerization reaction of the third step of the process in which an acrylamide and a comonomer are interpolymerized with the second step ester, it is desirable that a catalyst of addendum reaction, preferably of the free radical type be employed. Typical catalysts which may be so utilized include peroxygen compounds such as benzoyl peroxide, o,o'-dichlorobenzoyl peroxide, o,o'-di-bromobenzoyl peroxide, tertiary butyl hydroperoxide, cumene hydroperoxide, lauroyl peroxide, caproyl peroxide, acetone peroxide, pelargonyl peroxide, tetralin peroxide, p-menthane hydroperoxide, diisopropyl benzene hydroperoxide, diazo compounds and the like. The quantity of catalyst utilized may be varied widely. However, in general it is preferred to employ about 0.1 to about 5 percent by weight based upon the weight of the copolymerizable materials in the mixture.

The addendum interpolymerization of the third step or stage operation, preferably is conducted at a temperature of about 75° to 150° C. or thereabouts, or as previously indicated, at a temperature which will promote the addition reaction between the ethylenic groups of the dicarboxylic acid radicals in the ester with relatively little addition to the ethylenic groups in the fatty acid radicals. A very satisfactory temperature of reaction is obtained upon a steam bath, that is to say, at a temperature of about 90° to 100° C. The time required to effect a satisfactory degree of interpolymerization varies, depending upon conditions of operation and particularly the reactivity of the ethylenic comonomer employed with the acrylamide compound, as well as the degree of interpolymerization desired in the ultimate product. In conducting the interpolymerization reaction of this stage, it is also desirable to protect the reactants from undue oxidation, which result may be attained by the application of a blanket of an inert gas such as carbon dioxide, nitrogen, or combustion products resulting from the burning of butane in an atmosphere of air.

While it is preferred to conduct the third step interpolymerization reaction by a heating operation as above described, the application of irradiation as from actinic light in the presence of, or absence of catalysts and at room temperature or at elevated temperatures is not precluded.

For purposes of increasing the speed of the third step reaction, ionic catalysts such as sulfuric acid, phosphoric acid, polyphosphoric acid and sulfonic acids may be employed in appropriate amounts.

The resultant interpolymers of the third stage of the process, as obtained by the interpolymerization of the second step or stage esters with a comonomer mixture containing an acrylamide component, or a methacrylamide component, is usually a heavy resinous mass which is too viscous to pour at room temperature but which still retains flow properties under such conditions. The composition is soluble and homogeneous and as will be demonstrated hereinafter, deposits homogeneous films from solutions. It will be understood that these homogeneous solutions may contain small quantities of other copolymers and also small quantities of homopolymers dissolved therein.

The homogeneous soluble and ungelled interpolymers obtained in the third stage of the foregoing reaction can be diluted with non-reactive diluents or solvents selected from those disclosed hereinbefore, or the equivalents thereof, to substantially any degree desired, to obtain appropriate viscosity and concentration of solids in the solutions. Likewise, the interpolymers can be compounded before or after the addition of diluents, with fillers and pigments of various types including talc, finely divided precipitated calcium carbonate, titanium dioxide, carbon black and many others, to provide colored, or opaque paints and enamels. The solutions with, or without fillers or pigments can be applied by conventional methods of coatings such as spraying, brushing or roller coating to the surfaces of bodies of wood, metal, stone, brick or the like.

In order to promote the drying of the interpolymers to a relatively infusible, insoluble state desirable in the ultimate films of a coating composition, catalysts such as the conventional siccatives employed in paints and varnishes and including oleates, linoleates, naphthenates and and the like, of cobalt, nickel, manganese, lead and other similar heavy metals designed to promote cross-linking of the ester molecule at points of unsaturation in the fatty acid radicals may be employed. Such siccatives preferably are employed in amounts of about 0.01 to 1 or 2 percent by weight based upon the solids content. The foregoing percentages are calculated on the basis of the active metal in the compounds.

Films of the foregoing solutions after application, are dried to the hardened state, first by the evaporation of the solvent utilized in dissolving the resin content but preferably are ultimately hardened to the final stage by a baking operation at a temperature of about 100° to 300° C., or at such other temperature as will effect hardening of the plastic material without charring or discoloration.

In the above description, certain emphasis has been placed upon products which are copolymers or interpolymers of the second stage or step and the comonomer systems comprising methacrylamide or acrylamide. However, it is also possible further to modify such copolymers or interpolymers. For example, the copolymers or interpolymers can be mixed with cyclopentadiene or dicyclopentadiene or other cyclopentadiene homopolymers in an autoclave and then subjected to a temperature of about 250° to 350° C. to obtain further interpolymerization.

Under certain conditions other maleate esters, either simple esters such as dibutyl maleate, or more complex esters may be copolymerized in the system.

It will be understood that numerous modifiers may be included in the reaction mixtures of this invention. For example, in the third step or stage involving the interpolymerization of mixtures comprising (A) an ester of an alpha-beta ethylenic dicarboxylic acid with a partial ester of a polyhydric alcohol and a drying oil acid (B) a monomer mixture of an acrylamide with another monomer containing a $>C=CH_2$ group, inhibitors of gelation such as dodecylmercaptan may be added in amounts to prevent gelation during the heating operation.

Chain stoppers such as cyclopentadiene in an amount to terminate the interpolymerization when an adequate chain length is attained may be incorporated in the third step reaction.

Still a further class of modifiers which may be added (at a convenient stage) to the interpolymerizable mixtures, comprises cross-linking agents designed by their action to bond together short chain molecules to give products of increased viscosity or hardness. A useful cross-linking agent comprises formaldehyde, or formaldehyde forming agents such as paraformaldehyde. These can can react with the amide group of the acrylamide to give desired cross-linking effect.

Other cross-linking agents comprise diepoxides, diisocyanates, and others added in an amount to produce a desired cross-linking effect.

The following examples illustrate more full the preparation of the ester components of the copolymers, as well as the copolymers per se in accordance with the practice of this invention. The examples are not, however, intended to limit the scope of the invention for there are, of course, numerous possible variations and modifications permissible without departure from the spirit of the invention or the scope of the claims based thereupon.

EXAMPLE A

This example illustrates the preliminary alcoholysis of a glyceride oil to provide a hydroxy, or partial ester of of a polyhydroxy alcohol and higher fatty acids, suitable for subsequent esterification with a dibasic acid to provide an essentially neutral ester that can be interpolymerized by addition reaction with a monomer pair, one of which is an acrylamide. Since alcoholysis of glyceride oils is already known in the manufacture of alkyd resins, substantial details of the procedure and extensive mutiplication of examples, disclosing various oils as primary materials and in varying proportions, is not deemed to be necessary. The method is illustrated by the alcoholysis of linseed oil with glycerine which was conducted as follows:

Linseed oil was subjected to alcoholysis with monomeric pentaerythritol. A stainless steel kettle of 8 gallons capacity was employed as a reactor. This was provided with an inert gas supply, agitator, heating means and a thermometer. The charge was as follows:

Linseed oil _____pounds__ 35

Monomeric pentaerythritol _____ pounds__ 2.24
Litharge (catalyst) _____ grams__ 9.2

The charge was heated to 200° to 210° C. and the temperature was maintained for 4 hours. The product was mixed partial esters of the fatty acids of linseed oil with glycerol and pentaerythritol containing large amounts of monohydric ester.

A further example illustrating the preparation of a partial ester which may be used in the practice is as follows:

EXAMPLE B

The reaction vessel was a 5 liter, 3 necked glass flask equipped with a reflux condenser and agitator and a thermometer as well as a tube for the introduction of an inert blanketing gas such as that from the combustion of butane with air. Linseed oil in an amount of 2,212.5 grams (2.5 moles) was introduced into the flask along with 169.3 grams (1.67 moles plus a 10 percent excess) of glycerol. The mixture was blanketed with the inert gas and was then heated with agitation to 190° C. At this temperature, 1.25 grams of litharge was added as an alcoholysis catalyst. The mixture was maintained at 190° C. until alcoholysis was complete. The product was suitable for esterification with any of the dibasic acids herein disclosed to provide a second step ester product containing large amounts of monohydric esters suitable for subsequent interpolymerization with a monomer system containing an acrylamide to form the improved soluble ungelled fast drying interpolymers of this invention.

It will be apparent to those skilled in the art that this same method is applicable to the alcoholysis of the various other glyceride oils, such as soya oil, safflower oil, cotton seed oil and many others. Likewise, the polyhydric alcohol (glycerol) can be replaced by other polyhydric alcohols hereinbefore mentioned and comprising ethylene glycol, diethylene glycol, pentaerythritol and numerous other alcohols containing from about 2 to 6 hydroxy groups.

In the preparation of the partial esters suitable for subsequent esterification with a dibasic acid such as itaconic acid, the proportion of the added polyhydric alcohol preferably is so adjusted that the resultant partial esters of polyhydric alcohols and fatty acids will contain about 1 hydroxy group per molecule. However, there may be some dihydric esters as well as minor amounts of unreacted (tri-) glyceride in the hydroxylated esters.

The esterification of a partial ester with an alpha-beta ethylenic acid is illustrated by the following example:

EXAMPLE 1

In this example, the mixed partial esters from Example A were cooled in the kettle to a temperature of 150° C. and the charge was completed with 2.92 pounds of maleic anhydride and 5 pounds of xylene. The reaction charge was then heated to a temperature within a range of 170° to 180° C. and esterification was continued for 4.5 hours, or until an acid value below 20 was attained. Excess solvent was blown from the batch with inert gas. The resultant maleic esters were filtered and the properties of the same were as follows:

Solids _____ percent__ 98.7
Acid value _____ do____ 16.4
Viscosity _____ J
Gardner color _____ 6-7

In the foregoing product, approximately 33 percent of the available hydroxyls were esterified by the carboxyls of the maleic anhydride.

EXAMPLE 2

In accordance with this example, a 32.5 gram quantity (2.5 moles) of itaconic acid was introduced into the alcoholysis product of the linseed oil from Example B and the mixture in the reaction flask above described was further mixed with an inert diluent, namely xylene and the mixture was refluxed to obtain esterification at about 210° C. During the reaction water evolved was removed azeotropically and the xylene was returned to the reaction mass. The reaction was continued for 7 hours at which time it was stopped and the product was filtered. The product was an essentially neutral ester containing large amounts of ester of itaconic acid and the hydrolyzed oil with but a single acid group per molecule. The product was of the properties:

Acid value _____ 9.5
Hydroxyl value _____ 29.3
Solids content _____ [1] 93.8
Gardner color _____ 10
Gardner viscosity _____ G

[1] Percent by weight.

In the final ester product 60 molar percent of the hydroxyl groups were combined with fatty acids and 40 molar percent were combined with itaconic acid. This ester product was adapted for polymerizing with monomer mixtures comprising styrene, or other appropriate monomers containing the $>C=CH_2$ group and the acrylamide component such as acrylamide per se, or methacrylamide. Products so prepared may be employed for coating metals such as iron or steel, as well as wood or stone and other materials to provide fast-drying hard, mar-resistant and chemically resistant films. The freshly applied and liquid films can be dried to the hardened state by atmospheric temperatures and contacts; or they can be dried to a more hard and mar-resistant state by the application of higher temperatures in a baking operation.

The following example illustrates the further interpolymerization of the ester product of Example 1 with a monomer system comprising styrene and acrylamide.

EXAMPLE I

The charge in this example comprised the following mixture:

Sample 1

| | Grams |
|---|---|
| Maleic-linseed esters (from Example 1) | 500 |
| Styrene | 450 |
| Acrylamide (5% by weight of the reactive charge) | 50 |
| Xylene | 1,500 |
| Ditertiary butyl peroxide (free radical catalyst) | 10 |

The foregoing mixture was introduced into a 3-necked flask equipped with a stirrer, a reflux condenser and an electrical heating mantel. The mixture was then refluxed for 8 hours with agitation.

Sample 2

The foregoing run was repeated in its essential details except that the proportion of acrylamide was increased to 10 percent based upon the reactive charge.

Sample 3

For purposes of comparison still a third charge constituting a control and comprising the same maleic-alcoholized linseed oil maleic ester, but without acrylamide was subjected to interpolymerization by addition reaction as above described. The properties of the resultant soluble ungelled resins were as follows:

TABLE A

| Acrylamide | 0% | 5% | 10% |
|---|---|---|---|
| Percent solids | 49.2 | 42.4 | 39.1 |
| Viscosity | F-G | F-G | D-E |
| Gardner color | 3-4 | 11-12 | 12-13 |

Samples of the foregoing acrylamide modified interpolymers were spread upon test panels of steel and were baked at 300° F. for ½ hour. The properties of the resultant films were as follows:

TABLE B

| Acrylamide | 0% | 5% | 10% |
|---|---|---|---|
| Sward hardness | 16 | 14 | 24 |
| Impact resistance, inch lbs | 2 | 48 | 1 |
| Flexibility, percent | 20 | 20 | 20 |
| Alkali resistance, hours | 6½ | 24 | 30 |

It will be observed that the addition of acrylamide in the foregoing interpolymer substantially increased the alkali resistance in all instances. With 5 percent of acrylamide the impact resistance is greatly increased and with 10 percent of acrylamide the Sward hardness is greatly improved.

For purposes of obtaining films of high mar-resistance similar panels coated in like manner were subjected to baking at an increased temperature, namely for 350° F. for a period of ½ hour. The properties of the resultant films were as follows:

TABLE C

| Acrylamide | 0% | 5% | 10% |
|---|---|---|---|
| Sward hardness | 24 | 24 | 40 |
| Impact resistance, inch lbs | 1 | 48 | 48 |
| Flexibility, percent | 20 | 20 | 20 |
| Mar-resistance | Poor | Excellent | Excellent |
| Alkali resistance, hours | 23 | 50 | 50 |

In the foregoing tables, impacts are expressed in inch pounds. Flexibilities were determined upon a ⅛ to ½ inch conical mandrel. The mar-resistance was determined in conventional manner by pressing a finger nail edgewise against the film. Obviously, other dull edged instrumentality could be employed in like manner. It will be observed that such properties as impact resistance, Sward hardness and alkali resistance in all instances are greatly improved in the films containing acrylamide where the baking was performed at 350° F. It is to be considered that baking at this higher temperature produces a further reaction between the acrylamide residue and the other constituents of the films which is not obtained at lower baking temperatures such as 300° F. It will be observed that the Sward hardness is substantially greater in the films containing 10 percent acrylamide though in other respects the films essentially correspond in properties to those containing but 5 percent.

Films of the foregoing interpolymers containing 5 percent upon the basis of the reactive charge of acrylamide were also applied to test panels and subjected to air drying. The films were dry in 8 minutes as compared with corresponding films containing no acrylamide which dried in 30 minutes. The films containing 5 percent of acrylamide were also more mar resistant as determined by a finger nail test than were the corresponding samples free of acrylamide.

EXAMPLE II

This example is similar to Example I except that soya oil was substituted for linseed oil in the ester component. The alcoholyzed soya oil was reacted with maleic anhydride to provide a substantially neutral ester in which the ester linkages of the maleic acid comprised 33 percent of the total of the ester linkages. The foregoing ester in an amount of 500 parts by weight was incorporated with 450 parts by weight of styrene and 50 parts by weight (5 percent) of acrylamide. The reaction was catalyzed with 2 percent by weight based upon the interpolymerizable mixture of cumene hydroperoxide and the mixture was heated as in the preceding Example I to obtain a conversion of 88.5 percent, a viscosity of V (as determined in a 50–50 mixture of xylene) and a Gardner color of 5–6.

In a second test the percentage of acrylamide was increased to 10 percent. The percent conversion was 91.5, the viscosity was G+ and the Gardner color was 11.

Steel panels were successfully coated with the interpolymers of this example. They could be dried by air or by baking. When baked at 350° F. they exhibited good mar resistance though they were somewhat softer than those obtained by similar techniques from the interpolymer embodying linseed oil as the starting oil component.

While the esters of alpha-beta ethylenically unsaturated dicarboxylic acids and alcoholyzed glyceride oils (or the similar products obtained by esterification reaction between a polyhydric alcohol and appropriate fatty acids) are usually preferred, since the alpha-beta ethylenically unsaturated dicarboxylic acids provide additional reactive ethylenic groups in the polyesters, it will be appreciated that products which are still useful may be obtained by a similar esterification reaction between the partial esters and a non-ethylenic dicarboxylic acid such as phthalic acid, succinic acid or adipic acid. These products are essentially neutral esters and if properly prepared, are usually of short chain length containing in the most of the ester molecules but a single dicarboxylic acid radical. They can be caused to react by addition, apparently through the ethylenic groups of the fatty acid radicals with monomer mixtures comprising an acrylamide as one component. This type of product is illustrated by the following example.

EXAMPLE III

The oil component in this example was castor oil which has been dehydrated and the ester mixture was of the following composition:

| | Percent by weight |
|---|---|
| Dehydrated castor oil | 54.6 |
| Phthalic anhydride | 34 |
| Glycerol | 15.5 |

This ester in a proportion of 500 parts by weight was mixed with 450 parts of styrene and 50 parts of acrylamide. The mixture was interpolymerized as in the preceding Examples I and II. The product was spread upon test panels of steel as in the preceding examples and the films were baked at 350° F. for ½ hour. The properties were as follows:

TABLE D

| | |
|---|---|
| Sward hardness | 48 |
| Flexibility, percent | 2.5 |
| Impact resistance | 1″ lb. |
| Mar-resistance | Good |

It will be observed that the hardness of the resultant films was good, as was the mar-resistance, though the latter value was not quite so good as those obtained in Example I, where the dicarboxylic acid was alpha-beta ethylenic. The impact resistance and the flexibilty were decidedly below the corresponding values of Example I. Where the high flexibility and impact resistance of the films of Examples I and II are not required, these interpolymers may be used.

The hardenable copolymer products of Examples I, II, and III are susceptible of use as plasticizing agents in phenol-formaldehyde resins used in can coatings. They are also useful in other applications where speed in drying and high mar-resistance as compared with other oil copolymers is important.

EXAMPLE IV

An ester of maleic acid and pentaerythritol alcoholized linseed oil in which 33 molar percent of the total hydroxyls were esterified with maleic acid was prepared as in Example I. A charge was then prepared comprising:

| | |
|---|---|
| Xylene | 1500 parts by weight. |
| Ester | 500 parts by weight. |

| | |
|---|---|
| Styrene | 450 parts by weight. |
| Acrylamide | 50 parts by weight. |
| Ditertiary butylhydroperoxide | 10 parts by weight. |
| Cumene hydroperoxide | 2% by weight based on reactants. |
| Dodecylmercaptan | 0.5% by weight based on reactants. |

The mixture was heated as in the preceding examples successfully to form an interpolymer of the following properties:

| | |
|---|---|
| Solids content | percent 38.2 |
| Conversion | do 92 |
| Viscosity | B+ |
| Gardner color | 10–11 |

The dodecylmercaptan can be used to control gelation of the interpolymerizable mixture in the third stage. The product is a useful coating material for iron, brick, stone and the like.

The preceding embodiments of the invention are to be considered as being merely illustrative. It will be apparent to those skilled in the art that numerous modifications may be made therein without departure from the spirit of the invention or the scope of the appended claims.

We claim:

1. A method of forming a xylene soluble, non-gelled, ternary interpolymer, which comprises heating to a temperature of about 75° C. to about 150° C. a mixture of a liquid diluent and (A) an ester having an acid value below about 15 and being formed substantially completely from (1) a polycarboxylic acid of the class consisting of maleic acid, fumaric acid and itaconic acid, and (2) a partial ester of a polyhydric alcohol and a drying oil fatty acid, said polyhydric alcohol initially containing about 2 to about 6 hydroxyl groups per molecule, about 25 to about 50 percent by the hydroxyl groups originally characterizing the polyhydric alcohol being esterified by the ethylenically unsaturated polycarboxylic acid and the rest being esterified by the drying oil fatty acid; (B) a pair of monomers, one of said monomers being selected from the class consisting of acrylamide and methacrylamide, and the other of said monomers being selected from the class consisting of styrene, alpha methyl styrene and vinyl toluene, the monomer of the first mentioned class being present in an amount of about 5 to about 20 percent based upon the mixture, the two monomers of the pair comprising about 10 to about 100 percent by weight based upon the ester (A); and (C) about 0.1 to about 5 percent by weight based upon the interpolymerizable mixture of a peroxide catalyst of interpolymerization, heating of said mixture being continued until conversion of the mixture to said soluble, non-gelled, ternary interpolymer is substantially complete.

2. The interpolymer as defined in claim 1 in which the monomer designated by the formula is acrylamide.

3. The interpolymer as defined by claim 1 in which the monomer designated by the formula is methacrylamide.

References Cited in the file of this patent
UNITED STATES PATENTS

| | | |
|---|---|---|
| 2,407,479 | D'Alelio | Sept. 10, 1946 |
| 2,598,663 | Kropa | June 3, 1952 |
| 2,598,664 | Kropa | June 3, 1952 |
| 2,600,457 | Wynstra | June 17, 1952 |
| 2,748,092 | Daniel et al. | May 29, 1956 |